US00RE38990E

(19) United States
(12) Reissued Patent
Staat

(10) Patent Number: US RE38,990 E
(45) Date of Reissued Patent: Feb. 28, 2006

(54) MAGNETICALLY-ACTUATED COUPLER FOR MODEL RAILROAD CARS

(75) Inventor: Robert H. Staat, Goshen, KY (US)

(73) Assignee: Bachmann Industries, Inc., Philadelphia, PA (US)

(21) Appl. No.: 08/999,730

(22) Filed: Dec. 24, 1997

Related U.S. Patent Documents

Reissue of:
(64) Patent No.: 5,509,546
Issued: Apr. 23, 1996
Appl. No.: 08/292,880
Filed: Aug. 19, 1994

(51) Int. Cl.
*B61G 3/04* (2006.01)

(52) U.S. Cl. ..... 213/75 TC; 213/212
(58) Field of Classification Search ..... 213/75 A, 213/75 TC, 115, 159, 212, 216
See application file for complete search history.

(56) References Cited

U.S. PATENT DOCUMENTS

| | | | | | |
|---|---|---|---|---|---|
| 3,111,229 | A | * | 11/1963 | Edwards et al. | 213/212 |
| 3,115,255 | A | | 12/1963 | Edwards et al. | |
| 3,117,676 | A | | 1/1964 | Edwards et al. | |
| 3,469,713 | A | * | 9/1969 | Edwards et al. | 213/75 TC |
| 3,564,766 | A | * | 2/1971 | Edwards et al. | 213/75 TC |
| 3,840,127 | A | | 10/1974 | Edwards et al. | |
| 3,942,648 | A | | 3/1976 | Edwards et al. | |
| 4,335,820 | A | | 6/1982 | Gramera | |
| 4,512,483 | A | | 4/1985 | Crossley et al. | |
| 4,650,081 | A | * | 3/1987 | Diller | 213/75 TC |
| 4,765,496 | A | | 8/1988 | Diller | |
| 4,768,663 | A | | 9/1988 | Schuller | |
| 4,893,716 | A | | 1/1990 | Diller | |
| D326,693 | S | * | 6/1992 | Gramera | D21/141 |

OTHER PUBLICATIONS

Product Insert for Kadee Quality Products Magne–Matic Coupler, MKD 5&10 Couplers.

* cited by examiner

*Primary Examiner*—S. Joseph Morano
(74) *Attorney, Agent, or Firm*—Akin, Gump, Strauss, Hauer & Feld, L.L.P.

(57) ABSTRACT

A magnetically actuated coupling and uncoupling system for model railroads comprised of a drawbar pivotally-mounted to one end of a railroad car, wherein the drawbar contains an integral leaf spring extending from the first end of the coupler to tend to center the drawbar, a coupler body with cantilever springs secured to the second end of the drawbar, a magnetically-actuated post pivotally-secured to the drawbar extending downward from the drawbar, and a pivotally-mounted coupler knuckle secured to the post and pivotally secured to the drawbar such that the pivotally-mounted coupler knuckle will interact with the cantilever spring.

35 Claims, 3 Drawing Sheets

MAGNETICALLY-ACTUATED COUPLER FOR MODEL RAILROAD CARS

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates to model railroad equipment. More specifically, this invention relates to model railroad couplers which automatically couple and magnetically uncouple model railroad cars.

2. Prior Art

Model railroaders have developed various couplers for use in the coupling and uncoupling of model railroad equipment. One commonly used coupler is a hook-type coupler. Couplers of this type have been used with all scales of model railroad equipment including the more popular models adapted for use with "HO" gauge.

With the hook-type coupler coupling is normally relatively simple. When one coupler is thrust against an opposing coupler, the couplers pivot on pivot pins to the side to allow the hook on the end of each coupler to interact and thus engage the couplers of the model railroad equipment. However, uncoupling presents somewhat more of a problem. In an attempt to provide remote control and authenticity to the coupling of model railroad equipment, magnetic uncoupling systems have been developed as exemplified by U.S. Pat. Nos. 3,111,229 and 3,115,255 Delayed action magnetic couplers were introduced to overcome certain inadequacies in these early couplers as is disclosed in U.S. Pat. Nos. 3,117,676 and 3,469,713. In each of these devices a magnetically-activated pin extends downward from the hook of the coupler. As the pin is acted upon by a stationary magnet located between the tracks, the hook of the couplers opens to release one model railroad car from engagement with a second model railroad car.

A number of other similar magnetically activated uncoupling systems for use with model railroad equipment have been disclosed for example in U.S. Pat. Nos. 4,335,820, 3,942,648, 3,840,127, 3,564,766 and 3,469,713.

Another method for coupling and uncoupling model railroad equipment commonly used with "N" gauge equipment uses a pivoting claw coupling device which operates vertically by means of a coupling cam of an uncoupling rail, such that during coupling and uncoupling, the claw coupling device is lifted out of its coupling position in an upward direction. Coupling devices of this type are disclosed, for example, in U.S. Pat. Nos. 4,893,716, 4,768,663, 4,765,496, 4,650,081 and 4,512,483.

A number of problems exist with these coupling and uncoupling systems including the large number of parts necessary for each system, the difficulty of working with the small size of these parts, specific problems associated with some of the metallic spring elements which are key to some of the uncoupling systems, the unrealistic look of some of these uncoupling systems when compared with existing railroad equipment and the unreliability of some of the elements of these uncoupling systems.

Therefore, it is an object of this invention to provide a magnetic uncoupling system for use with model railroad equipment.

It is a further object of this invention to provide a magnetic uncoupling system which is easy to assemble and use.

It is a still further object of this invention to provide a magnetic uncoupling system which is realistic looking when compared with existing full scale train equipment.

It is a still further object of this invention to provide a magnetic uncoupling system which contains a reliable centering system for the uncoupling system.

It is a still further object of this invention to provide a magnetic uncoupling system which uses a pivoting knuckle system urged to a closed position by a cantilever spring.

These and other objects and features of the present invention will become apparent to those skilled in the art from a consideration of the following detailed description, drawings and claims. The description along with the accompanying drawings, provides a preferred selected example of construction of the device to illustrate the invention.

SUMMARY OF THE INVENTION

In accordance with the present invention there is provided a magnetically-actuated coupling and uncoupling coupler (10) for attachment to existing model railroad equipment comprised of a drawbar (12) with first (14) and second (16) ends, wherein said drawbar is pivotally mounted at one end of a model railroad car, wherein an integral element of the drawbar which is secured to the first end of the drawbar is an integral leaf spring (18) to center the drawbar (12) within a coupler pocket (20) in an end of said model railroad car, a coupler head (22) with integral cantilever spring (24) secured to the second end (16) of said drawbar, a coupler knuckle (26) pivotally attached to the second end (16) of the drawbar such that the coupler knuckle (26) interacts with the cantilever spring (24) of the coupler head (22) to urge the coupler knuckle to a centered, closed position, and a magnetically-activated pivot post (28) descending from said second end (16) of the drawbar, wherein said post is secured to the coupler knuckle (26) such that when said magnetically-activated pivot post (28) is pivoted by magnetic activation it opens the coupler knuckle.

BRIEF DESCRIPTION OF THE DRAWINGS

This invention will now be described with reference to the accompanying drawings in which.

DETAILED DESCRIPTION OF THE PREFERRED EMBODIMENT

Figure 1:
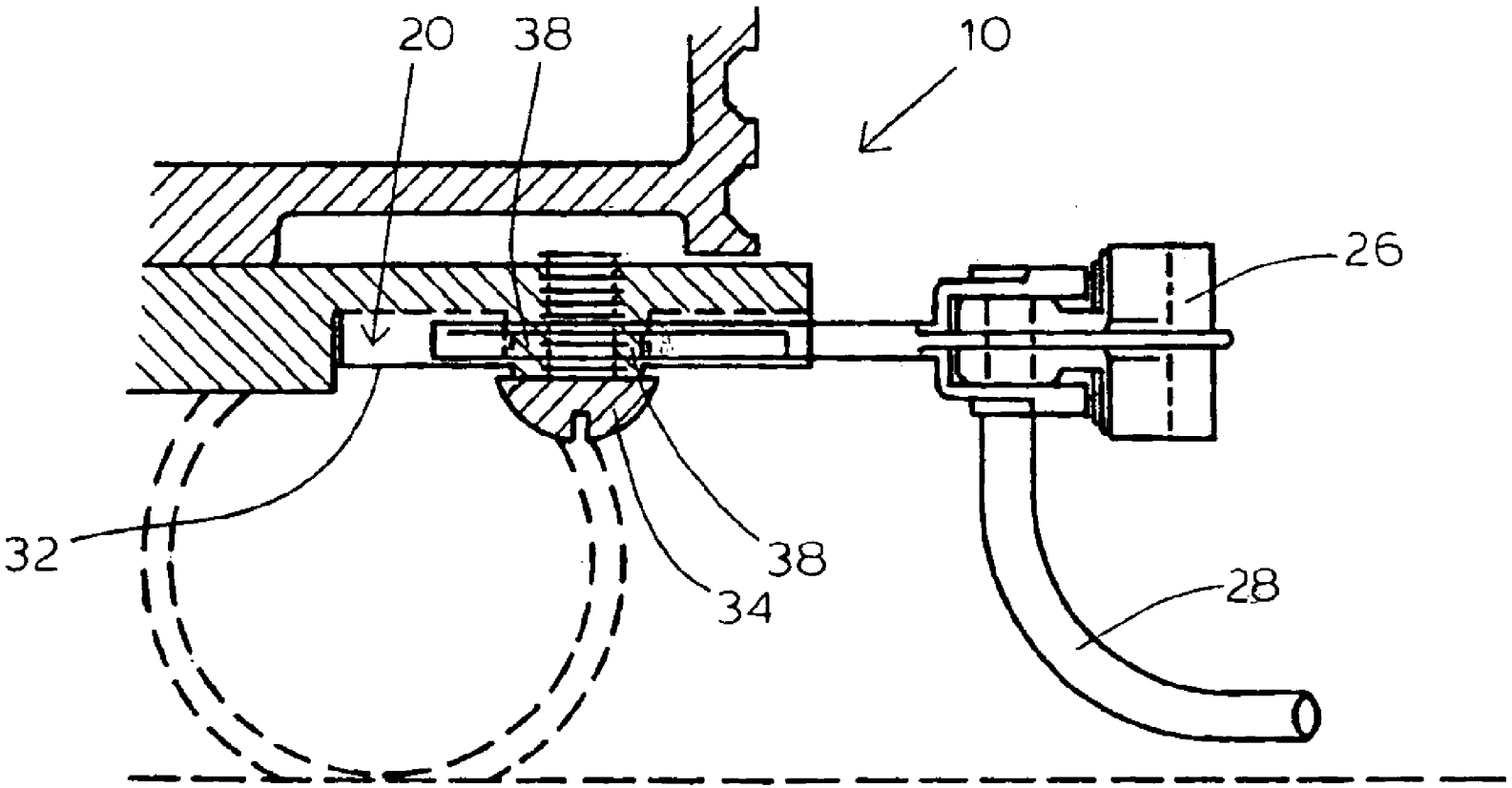
FIG. 1 is a view of a model railroad car with coupler system in place.

Although the invention is adaptable to a wide variety of uses, it is shown in the drawings for purpose of illustration as embodied in a magnetically-actuated coupler system for model railroad cars comprised of a magnetically-actuated coupler (10) attached to one end of a model railroad car. See FIG. 1.

Figure 8:
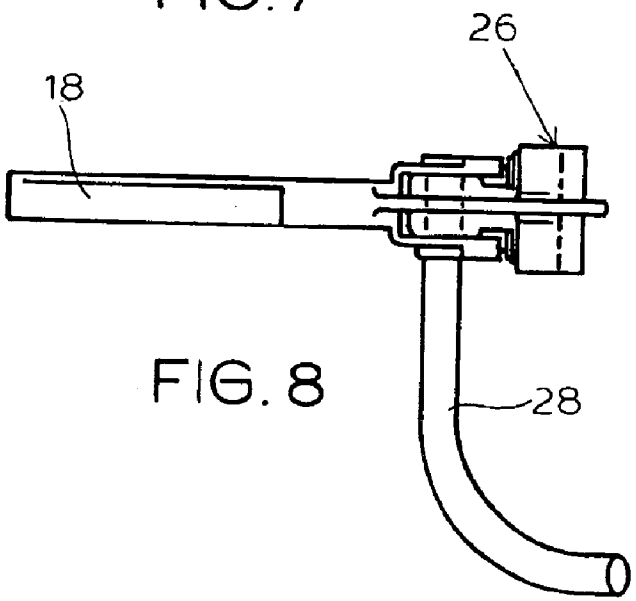
FIG. 8 is a left side view of the coupler knuckle attached to the drawbar.

The magnetically-actuated coupler (10) is generally comprised of a coupler body comprised of a drawbar (12) with first (14) and second (16) functional ends, (these are referred to mesial and distal respectively), a coupler knuckle (26) and a magnetically-actuated pivot post (28). See FIG. 8. The complete coupler assemble will be mounted to a model railroad car or locomotive through the use of a coupler pocket (20) usually found on both ends of the car or locomotive.

Figure 2:
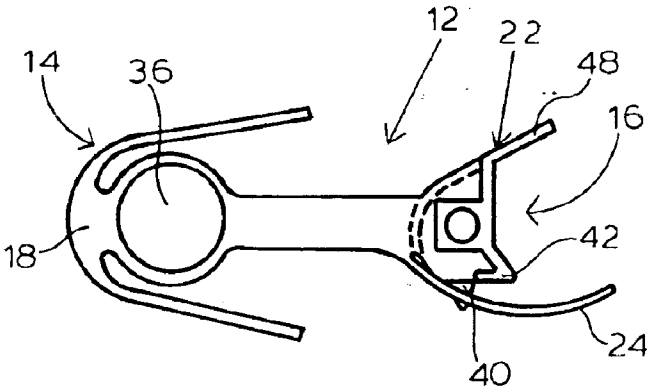
FIG. 2 is a top view of the drawbar.

Mounted in the coupler pocket (20) of the model railroad car is the first (14) or mesial end of the drawbar. The mesial end of the drawbar is attached to a central pivot post (38) within the coupler pocket (20) by placing an opening (36) in the first end (14) of the drawbar over the central pivot post (38) to secure it in place. The first end (14) of the drawbar is urged to a central or coupling position by an integral leaf spring (18) which extends away from the first end (14) of the drawbar (12) and then wraps back around both sides of the first end (14) of the drawbar and forms the shape of a "C" within the coupler pocket (20). See FIG. 2. This C-shaped leaf spring (18) which extends to both side edges of the coupler pocket (30) returns the drawbar (12) to center in response to any lateral thrust or movement. This leaf spring (18) is an improvement over earlier combination leaf springs and spurs as it is of one-piece construction and is an integral component of the drawbar (12).

Figure 7:
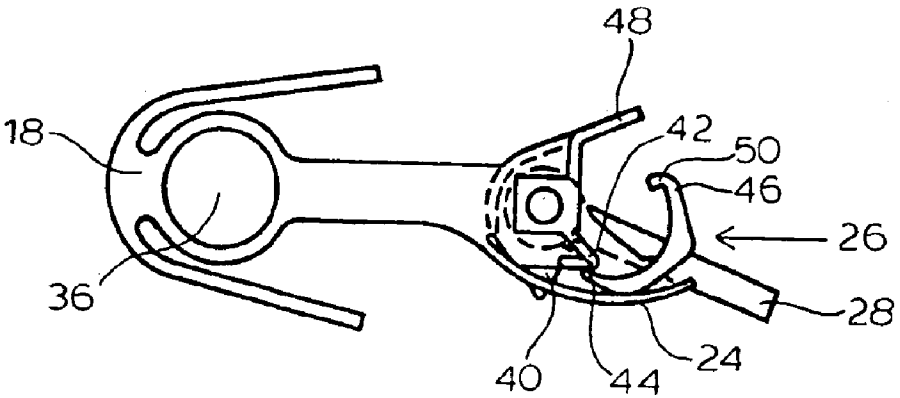
FIG. 7 is a top view of the coupler knuckle attached to the drawbar.

The terminus of the second (16) or distal end of the drawbar has secured thereto the coupler head (22). The coupler head (22) is an integral element of the distal end (16) of the drawbar (12). The coupler head (22) has a general "C" shape which follows the full-scale prototype closely. Major functions of the coupler head include forming the attachment point for the coupler knuckle (26) and to limit or control the movement of the coupler knuckle. Limitation of the pivotal movement of the coupler knuckle (26) is accomplished by a pair of stops (40, 42) incorporated as integral elements of the coupler head (22). The first stop (40) extends out from the body of the coupler head (22) at an approximate angle of approximately 70°–90° from the body of the drawbar. This stop prevents excessive opening of the coupler knuckle by interacting with the edge (44) of the coupler knuckle opposite from the tip (46) of the coupler knuckle. As the coupler opens, the edge (44) interacts with the first stop (40) to prevent additional opening of the coupler knuckle. The second stop (42) contained within the coupler head (22) is parallel to the drawbar (12) and interacts with the inside of the coupler knuckle to prevent excessive closing of the coupler knuckle. See FIG. 7. Opposite from the first and second stops is an extension lip (48) forming the opposite side of the c-shape distal end of the coupler head. This extension lip (48) extends preferably about 0.05 to about 2.0 millimeters from the remainder of the body of the coupler head (22). It extends out at an angle of about 30° from the body of the drawbar (12) and is used for pushing of model railroad cars after they are magnetically decoupled.

An integral element of the drawbar, which is secured to the drawbar just back of the coupler head, is the cantilever spring (24) which curves slightly away from the coupler body. See FIGS. 2 and 7. This cantilever spring is manufactured as an integral element of the drawbar (12) and is comprised of a thin, resilient piece which extends forward approximately 6.0 mm to about 1.0 mm of the end of the coupler knuckle. This cantilever spring is preferably prepared from engineering plastic and is an integral part of the casting comprising the drawbar (12).

Figure 4:
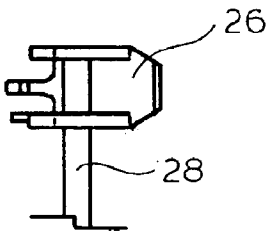
FIG. 4 is an end view of the drawbar.
Figure 3:
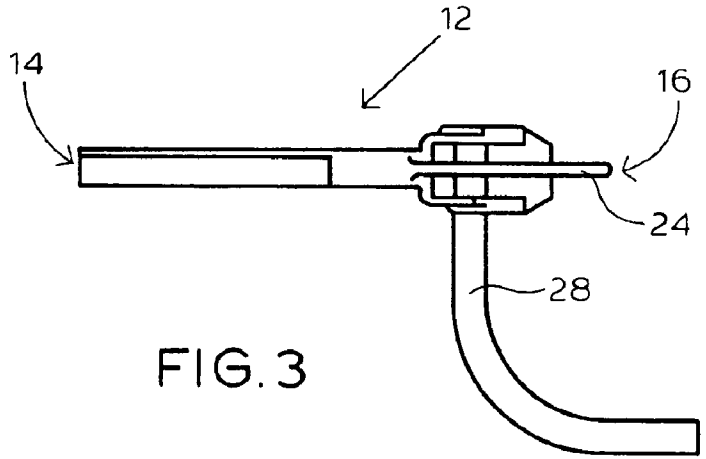
FIG. 3 is a side view of the drawbar.

Extending through the coupler head is the magnetically sensitive pivot post (28) which extends upward through both the second end (16) of the drawbar and the coupler knuckle (26). It pivots freely within the drawbar (12) but is firmly secured to the coupler knuckle (26). See FIGS. 3, 4 and 8. This pivot post (28) descends downward away from the coupler body. As the post descends downward it bends forward so that it extends laterally to the model railroad car and is positioned just off center of the longitudinal center line of any magnet which may be placed between the rails of the railroad track when the coupler knuckle (26) is in the closed position. See FIG. 3. When magnetically activated, the pivot post pivots outwardly toward the rails of the track.

Figure 6:
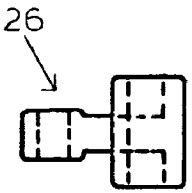
FIG. 6 is a left side view of the coupler knuckle.
Figure 5:
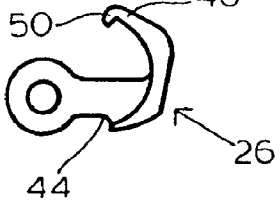
FIG. 5 is a top view of the coupler knuckle.

Pivotally connected to the post is the hook-shaped coupler knuckle (26). See FIGS. 5 and 6. The hook-shaped coupler knuckle is preferably of one-piece construction and is secured via a knurled friction fit to the post such that it will pivot as the pivot post (28) pivots. See FIGS. 3 and 4. The tip (46) of the hook-shaped coupler knuckle located away from the post contains a lip (50) to resist the decoupling of the model railroad cars and locomotives when the train is under tension of movement. This lip (50) tends to keep the cars coupled except when there is no tension on the opposing couplers and when the pivot posts are magnetically activated to draw the coupler knuckles apart and decouple the model railroad cars or locomotives.

The coupler pocket (20) is provided preferable on both ends of a model railroad car or locomotive into which the complete coupler (10) will be attached. The bottom side of the coupler pocket opening is closed by means of a cover plate (32). The magnetically actuated coupler (10) is generally secured into the coupler pocket (20) by placing the opening in the mesial end (14) of the drawbar (12) over a coupler pocket post (38) which extends downward within the coupler pocket. The complete assembly can be affixed to the model railroad car or locomotive by a number of systems including a screw (34) which extends upward through the coupler pocket post (38) into the lower body of the car or locomotive, a pair of screws through cars on each side of the coupler box or by adhesive securing of the pocket to the underside of the model.

In operation, the cantilever spring (24) which is an integral part of the drawbar (12) tends to force the hook-shaped coupler knuckle (26) to a closed position and thus, assist in keeping the hook-shaped coupler knuckle (26) coupled with an opposite directed coupler knuckle of an opposing model railroad car or locomotive unless acted on by a magnet to open the hook-shaped coupler knuckle (26) by the movement of the magnetically-actuated pivot post (28). The cantilever spring (24) is a significant improvement over the coiled spring returns used on previous products because the force of the cantilever spring is applied tangentially to the coupler head rather than circumferentially. Additionally, the spring is an integral part of the coupler body facilitating ease of manufacture and greatly reducing or eliminating the model maker's frustration of continual replacement of dislodged and/or lost metallic coil springs.

To effectively decouple the models equipped with the device described herein, a laterally polarized magnet is preferably placed stationarily between the rails of model railroad track. The polarity of the magnets preferably is parallel to the rails with the poles being continuous along the side edges thereby causing the magnetically-actuated post to pivot outwardly when activated by the magnet. As the pivot post pivots outwardly, it rotates the hook-shaped coupler knuckle (26) outwardly thus opening the coupler (10). The opposing pole of the magnet located between the tracks concomitantly urges the post of the interrelated coupler to decouple in the opposite direction from the first coupler. As the hook-shaped coupler knuckle (26) pivots away from the oppositely directed coupler, the body of the hook-shaped coupler impacts the cantilever spring (24) of the coupler head (22). The amount of pressure placed on the coupler head (22) by the cantilever spring (24) increases as the distance that the hook-shaped coupler is pivoted increases. When not activated by a magnet, the cantilever spring (24) tends to urge the coupler knuckle (26) inwardly toward a closed position, thus maintaining the coupled integrity of the train.

The leaf spring (18), which is an integral part of the drawbar (12), located at an opposite end from the coupler knuckle permits the coupler (10) to pivot back and forth within the coupler pocket either as the coupler is acted upon by a magnetic force or as the model railroad car moves along the tracks even on curved sections. Thus, the model railroad cars stay coupled while still moving along the tracks until the uncoupling system is activated by magnets located between the tracks. When decoupled and no longer subject to a magnetic force from between the rails, the leaf spring (18) centers the coupler head in a position for interaction with a second opposing coupler to achieve the coupled condition as the two couplers are gently nudged together.

I claim:

[1. A magnetically-actuated coupler assembly for a model railroad car comprising (a) a drawbar with first and second ends, capable of being pivotally mounted within a coupler pocket in the end of a model railroad car, (b) formed as an integral part of the first end of the drawbar is a leaf spring extending from the first end of the drawbar, (c) secured to the second end of the drawbar is a coupler head, wherein the coupler head contains a pair of stops which limit the movement of a pivotally mounted coupler knuckle;

(d) a cantilever spring formed as an integral part of the drawbar located proximal from the coupler body, (e) a magnetically-actuated post pivotally secured to the drawbar which extends downward from the drawbar, and (f) the pivotally mounted coupler knuckle is pivotally secured to the second end of the drawbar such that it is in constant interaction with the cantilever spring to urge the coupler knuckle to a closed or coupled position.]

2. The magnetically-actuated coupler assembly of claim [1] *6* wherein the leaf spring is secured to the first end of the drawbar and extends outward and around the first end of the drawbar to form generally a C-shape.

3. The magnetically-actuated coupler assembly of claim [1] *6* wherein an outer tip of the coupler knuckle contains a lip which extends inward toward the post.

4. The magnetically-actuated coupler assembly of claim [1] *6* wherein the drawbar includes an extension lip, extending from the drawbar.

5. The magnetically actuated coupler assembly of claim [1] *6* wherein the coupler knuckle contains a slot, an edge of which interacts with one of the stops of the coupler head to limit the capability of the coupler knuckle to open.

*6. A magnetically-actuated coupler assembly for a model railroad car comprising:*

*(a) a drawbar with first and second ends, capable of being pivotally mounted within a coupler pocket of a model railroad car;*

*(b) a leaf spring formed as an integral part of the first end of the drawbar which extends from the first end of the drawbar;*

*(c) a coupler head secured to the second end of the drawbar,*

*(d) a cantilever spring formed as an integral part of the drawbar located proximal from the coupler body,*

*(e) a magnetically-actuated post pivotally secured to the drawbar which extends downward from the drawbar, and*

*(f) a pivotally mounted coupler knuckle, pivotally secured to the second end of the drawbar such that it is in constant contact with the cantilever spring to urge the coupler knuckle to a closed or coupled position, the cantilever spring having a first portion which curves away from the coupler head and a free end which curves back toward the coupler knuckle to apply a tangential force to the coupler knuckle, the coupler head containing a pair of stops which limit the movement of the pivotally mounted coupler knuckle.*

*7. The magnetically-actuated coupler assembly of claim 6 wherein the cantilever spring is molded from engineering plastic.*

*8. The magnetically-actuated coupler assembly of claim 6 wherein the cantilever spring and the leaf spring are molded from engineering plastic as a unitary piece with the drawbar.*

*9. A magnetically-actuated coupler assembly for a model railroad car comprising:*

*a drawbar capable of being pivotally mounted within a coupler pocket of a model railroad car, the drawbar including a first end having a leaf spring formed as an integral part thereof which extends from the first end of the drawbar, a coupler head formed on a second end of the drawbar, and a cantilever spring formed as an integral part of the drawbar extending from the drawbar adjacent to the coupler head;*

*a pivotable coupler knuckle secured to the coupler head; and*

*a magnetically-actuated post which pivotally secures the coupler knuckle to the coupler head, the magnetically-actuated post being pivotally connected to and extending downwardly from the coupler head, the coupler knuckle being in constant contact with the cantilever spring to urge the coupler knuckle to a closed or coupled position, the cantilever spring having a first portion which curves away from the drawbar and a free end which curves back toward the coupler knuckle to apply a tangential force to the coupler knuckle, such that the magnetically-actuated coupler is assembled from three parts and the coupler head containing a pair of stops which limit the movement of the pivotally mounted coupler knuckle.*

*10. A magnetically-actuated coupler assembly for a model railroad car comprising:*

*(a) a drawbar with first and second ends, the first end being configured for pivotal mounting within a coupler pocket of a model railroad car;*

*(b) a coupler head at the second end of the drawbar,*

*(c) a magnetically-actuated post pivotally secured to the drawbar so as to extend downward from the drawbar,*

*(d) a coupler knuckle pivotally secured to the second end of the drawbar with the post, the coupler head having a pair of stops which limit the pivotal movement of the coupler knuckle on the drawbar, and*

*(e) a cantilever spring formed as an integral part of the drawbar, the cantilever spring including a first portion extending from the drawbar proximally the coupler head which curves away from the drawbar and the coupler knuckle and a free end which curves back*

*toward the coupler knuckle sufficiently so as to constantly apply a tangential force against the coupler knuckle and urge the coupler knuckle to a closed or coupled position in all positions of the coupler knuckle between the pair of stops.*

*11. The magnetically-actuated coupler assembly of claim 10 wherein the outer tip of the coupler knuckle contains a lip which extends inward toward the post.*

*12. The magnetically-actuated coupler assembly of claim 10 wherein the drawbar includes an extension lip, extending from the drawbar.*

*13. The magnetically actuated coupler assembly of claim 10 wherein the coupler knuckle contains a slot, an edge of which interacts with one of the stops of the coupler head to limit the capability of the coupler knuckle to open.*

*14. The magnetically-actuated coupler assembly of claim 10 wherein the cantilever spring and the drawbar are molded together as a unitary piece from engineering plastic.*

*15. The magnetically-actuated coupler assembly of claim 10 further comprising a leaf spring secured to the first end of the drawbar and extending outward and around the first end of the drawbar to form a C-shape.*

*16. A magnetically-actuated coupler assembly for a model railroad car comprising:*

*(a) a drawbar with first and second ends, the first end being configured for pivotal mounting within a coupler pocket of a model railroad car;*

*(b) a coupler head at the second end of the drawbar,*

*(c) a magnetically-actuated post pivotally secured to the drawbar so as to extend downward from the drawbar,*

*(d) a coupler knuckle pivotally secured to the second end of the drawbar with the post, the coupler head having a pair of stops which limit the pivotal movement of the coupler knuckle on the drawbar,*

*(e) a cantilever spring formed as an integral part of the drawbar, the cantilever spring including a first portion extending from the drawbar proximally the coupler head which curves away from the drawbar and the coupler knuckle and a free end which curves back toward the coupler knuckle sufficiently so as to constantly apply a tangential force against the coupler knuckle and urge the coupler knuckle to a closed or coupled position in all positions of the coupler knuckle between the pair of stops, and*

*(f) a leaf spring secured to the first end of the drawbar and extending outward and around the first end of the drawbar to form a C-shape.*

*17. A magnetically-actuated coupler assembly for a model railroad car comprising:*

*a drawbar having a first end adapted to be pivotally mounted within a coupler pocket of a model railroad car and an opposing, second end,*

*a coupler head formed on the second end of the drawbar,*

*a cantilever spring formed as an integral part of the drawbar extending from the drawbar adjacent to the coupler head;*

*a coupler knuckle pivotally secured to the coupler head; and*

*a magnetically-actuated post pivotally securing the coupler knuckle to the coupler head, the magnetically-actuated post being pivotally connected to and extending at least downwardly from the coupler head, the coupler knuckle being in constant contact with the cantilever spring to urge the coupler knuckle to a closed or coupled position, the cantilever spring having a first portion which curves away from the drawbar and a free end which curves back toward the coupler knuckle to apply a tangential force to the coupler knuckle, such that the magnetically-actuated coupler is assembled from three parts, and*

*the coupler head containing a pair of stops which limit the movement of the pivotally mounted coupler knuckle.*

*18. The magnetically-actuated coupler assembly of claim 17 wherein the outer tip of the coupler knuckle contains a lip which extends inward toward the post.*

*19. The magnetically actuated coupler assembly of claim 17 wherein the coupler knuckle contains a slot, an edge of which interacts with one of the stops of the coupler head to limit the capability of the coupler knuckle to open.*

*20. A magnetically-actuated coupler assembly for a model railroad car comprising:*

*a drawbar having a first end adapted to be pivotally mounted within a coupler pocket of a model railroad car and an opposing, second end,*

*a coupler head formed on the second end of the drawbar,*

*a cantilever spring formed as an integral part of the drawbar extending from the drawbar adjacent to the coupler head;*

*a coupler knuckle pivotally secured to the coupler head; and*

*a magnetically-actuated post pivotally securing the coupler knuckle to the coupler head, the magnetically-actuated post being pivotally connected to and extending at least downwardly from the coupler head, the coupler knuckle being in constant contact with the cantilever spring to urge the coupler knuckle to a closed or coupled position, the cantilever spring having a first portion which curves away from the drawbar and a free end which curves back toward the coupler knuckle to apply a tangential force to the coupler knuckle, such that the magnetically-actuated coupler is assembled from three parts, and*

*the coupler head containing a pair of stops which limit the movement of the pivotally mounted coupler knuckle; and*

*a leaf spring secured to the first end of the drawbar and extending outward and around the first end of the drawbar to form a C-shape.*

*21. The magnetically-actuated coupler assembly of claim 20 wherein the cantilever spring and the drawbar are molded together as a unitary piece from engineering plastic.*

*22. A magnetically-actuated coupler assembly for a model railroad car comprising:*

*a drawbar capable of being pivotally mounted within a coupler pocket in the end of a model railroad car, the drawbar including a first end having a leaf spring formed as an integral part thereof which extends from the first end of the drawbar, a coupler head formed on a second end of the drawbar, and a cantilever spring formed as an integral part of the drawbar extending from the drawbar adjacent to the coupler head;*

*a pivotable coupler knuckle secured to the coupler head; and*

*a magnetically-actuated post which pivotally secures the coupler knuckle to the coupler head, the magnetically-actuated post being pivotally connected to and extending downwardly from the coupler head, the coupler knuckle being in constant contact with the cantilever spring to urge the coupler knuckle to a closed or coupled position, the cantilever spring having a first*

*portion which curves away from the drawbar and a free end which curves back toward the coupler knuckle to apply a tangential force to the coupler knuckle, such that the magnetically-actuated coupler is assembled from three parts and the coupler head containing a pair of stops which limit the movement of the pivotally mounted coupler knuckle.*

*23. A magnetically-actuated coupler assembly for a model railroad car comprising:*

*(a) a drawbar with first and second ends, the first end being configured for pivotal mounting within a coupler pocket in the end of a model railroad car;*

*(b) a coupler head at the second end of the drawbar;*

*(c) a magnetically-actuated post pivotally secured to the drawbar so as to extend downward from the drawbar;*

*(d) a coupler knuckle pivotally secured to the second end of the drawbar with the post, the coupler head having a pair of stops which limit the pivotal movement of the coupler knuckle on the drawbar;*

*(e) a leaf spring being formed as an integral part of the first end of the drawbar and extending from the first end of the drawbar; and*

*(f) a cantilever spring formed as an integral part of the drawbar, the cantilever spring including a first portion extending from the drawbar proximally the coupler head which curves away from the drawbar and the coupler knuckle and a free end which curves back toward the coupler knuckle sufficiently so as to constantly apply a tangential force against the coupler knuckle and urge the coupler knuckle to a closed or coupled position in all positions of the coupler knuckle between the pair of stops.*

*24. The magnetically-actuated coupler assembly of claim 23 further comprising the leaf spring secured to the first end of the drawbar extending outward and around the first end of the drawbar to form a C-shape.*

*25. The magnetically-actuated coupler assembly of claim 23 wherein the outer tip of the coupler knuckle contains a lip which extends inward toward the post.*

*26. The magnetically-actuated coupler assembly of claim 23 wherein the drawbar includes an extension lip, extending from the drawbar.*

*27. The magnetically actuated coupler assembly of claim 23 wherein the coupler knuckle contains a slot, an edge of which interacts with one of the stops of the coupler head to limit the capability of the coupler knuckle to open.*

*28. The magnetically-actuated coupler assembly of claim 23 wherein the cantilever spring and the drawbar are molded together as a unitary piece from engineering plastic.*

*29. A magnetically-actuated coupler assembly for a model railroad car comprising:*

*a drawbar having a first end adapted to be pivotally mounted within a coupler pocket in the end of a model railroad car and an opposing, second end;*

*a coupler head formed on the second end of the drawbar;*

*a leaf spring being formed as an integral part of the first end of the drawbar and extending from the first end of the drawbar;*

*a cantilever spring formed as an integral part of the drawbar and extending from the drawbar adjacent to the coupler head;*

*a coupler knuckle pivotally secured to the coupler head;*

*a magnetically-actuated post pivotally securing the coupler knuckle to the coupler head, the magnetically-actuated post being pivotally connected to and extending at least downwardly from the coupler head, the coupler knuckle being in constant contact with the cantilever spring to urge the coupler knuckle to a closed or coupled position, the cantilever spring having a first portion which curves away from the drawbar and a free end which curves back toward the coupler knuckle to apply a tangential force to the coupler knuckle, such that the magnetically-actuated coupler is assembled from three parts; and*

*the coupler head containing a pair of stops which limit the movement of the pivotally mounted coupler knuckle.*

*30. The magnetically-actuated coupler assembly of claim 29 further comprising the leaf spring secured to the first end of the drawbar extending outward and around the first end of the drawbar to form a C-shape.*

*31. The magnetically-actuated coupler assembly of claim 30 wherein the cantilever spring and the drawbar are molded together as a unitary piece from engineering plastic.*

*32. The magnetically-actuated coupler assembly of claim 29 wherein the outer tip of the coupler knuckle contains a lip which extends inward toward the post.*

*33. The magnetically-actuated coupler assembly of claim 29 wherein the drawbar includes an extension lip, extending from the drawbar.*

*34. The magnetically actuated coupler assembly of claim 29 wherein the coupler knuckle contains a slot, an edge of which interacts with one of the stops of the coupler head to limit the capability of the coupler knuckle to open.*

*35. A magnetically-actuated coupler assembly for a model railroad car comprising:*

*(a) drawbar with first and second ends, the first end being configured for pivotal mounting within a coupler pocket of a model railroad car;*

*(b) a coupler head at the second end of the drawbar;*

*(c) a magnetically-actuated post pivotally secured to the drawbar so as to extend downward from the drawbar;*

*(d) a coupler knuckle pivotally secured to the second end of the drawbar with the post, the coupler head having a pair of stops which limit the pivotal movement of the coupler knuckle on the drawbar;*

*(e) a cantilever spring formed as an integral part of the drawbar, the cantilever spring including a first portion extending from the drawbar proximally the coupler head which curves away from the drawbar and the coupler knuckle and a free end which curves back toward the coupler knuckle sufficiently so as to constantly apply a tangential force against the coupler knuckle and urge the coupler knuckle to a closed or coupled position in all positions of the coupler knuckle between the pair of stops; and*

*(f) a spring operably coupled with the first end of the drawbar and configured to be received with the first end of the drawbar in the coupler pocket of the model railroad car.*

*36. A magnetically-actuated coupler assembly for a model railroad car comprising:*

*a drawbar having a first end adapted to be pivotally mounted within a coupler pocket of a model railroad car and an opposing, second end;*

*a coupler head formed on the second end of the drawbar;*

*a cantilever spring formed as an integral part of the drawbar extending from the drawbar adjacent to the coupler head;*

*a coupler knuckle pivotally secured to the coupler head;*

*a magnetically-actuated post pivotally securing the coupler knuckle to the coupler head, the magnetically-*

*actuated post being pivotally connected to and extending at least downwardly from the coupler head, the coupler knuckle being in constant contact with the cantilever spring to urge the coupler knuckle to a closed or coupled position, the cantilever spring having a first portion which curves away from the drawbar and a free end which curves back toward the coupler knuckle to apply a tangential force to the coupler knuckle, such that the magnetically-actuated coupler is assembled from three parts;*

*the coupler head containing a pair of stops which limit the movement of the pivotally mounted coupler knuckle; and*

*a spring operably coupled with the first end of the drawbar and configured to be received with the first end of the drawbar in the coupler pocket of the model railroad car.*

* * * * *